March 6, 1956 M. TOMASOVICH 2,736,987
INSECTICIDE DISTRIBUTOR
Filed Feb. 8, 1954
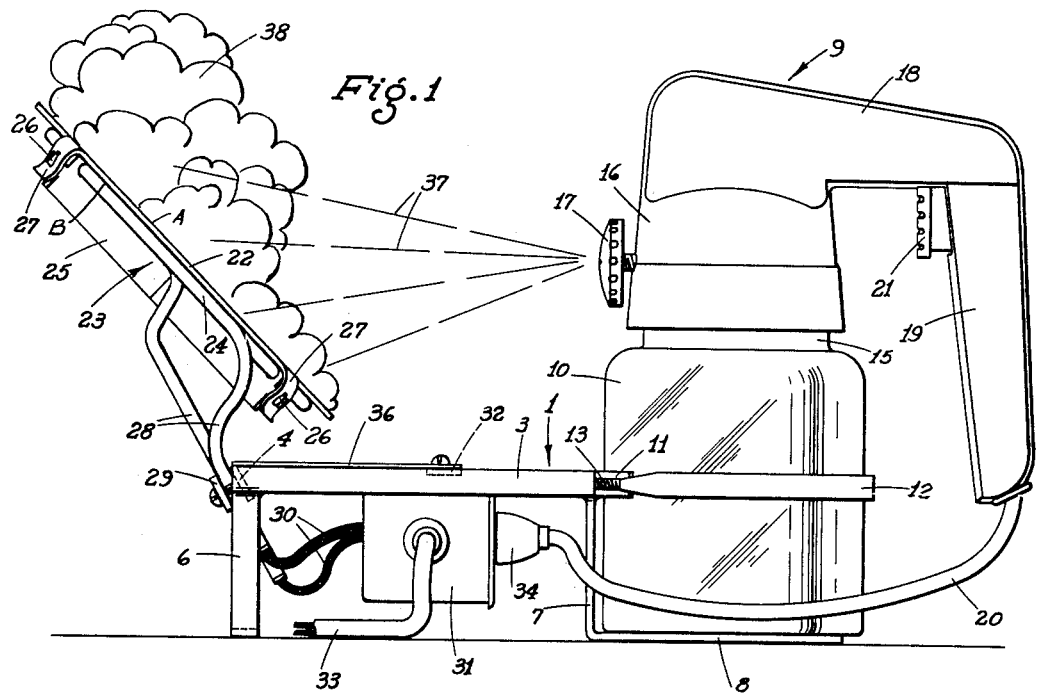
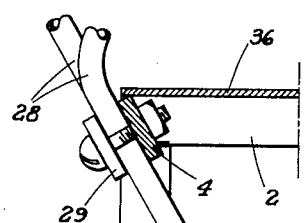
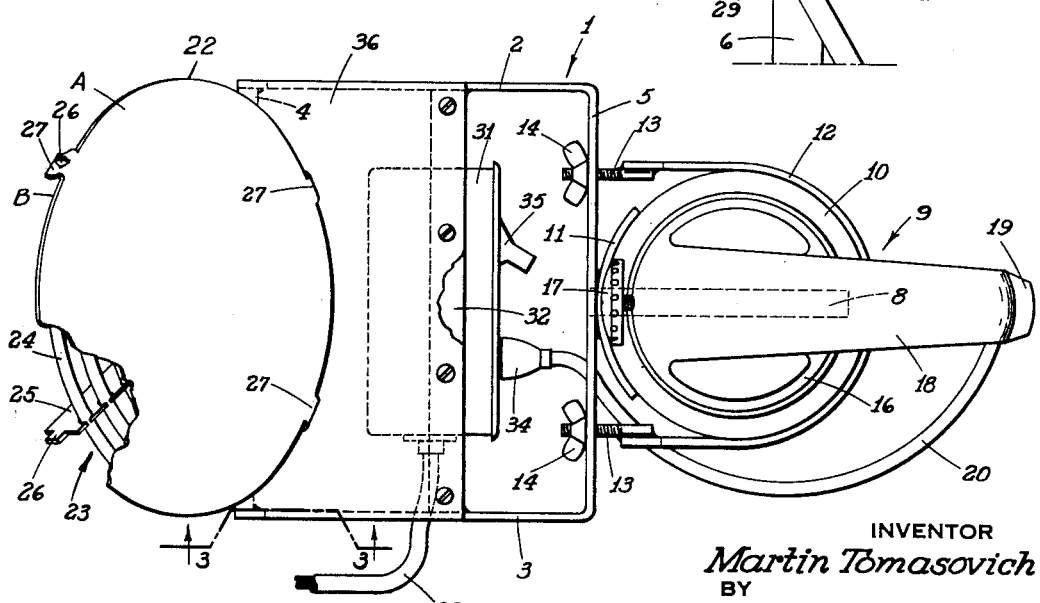
INVENTOR
*Martin Tomasovich*
BY
*Webster & Webster*
ATTYS

United States Patent Office

2,736,987
Patented Mar. 6, 1956

2,736,987

INSECTICIDE DISTRIBUTOR

Martin Tomasovich, Live Oak, Calif.

Application February 8, 1954, Serial No. 408,759

6 Claims. (Cl. 43—129)

This invention is directed to, and it is a major object to provide, a novel portable device for distributing or disseminating an insecticide into the atmosphere for the purpose of exterminating insects such as mosquitos, flies, gnats, or the like; the device being especially designed—but not limited—for domestic use, as—for example—in home yards or gardens, on patios, or on open porches.

Another important object of the present invention is to provide an insect distributor which is operative to vaporize a liquid insecticide mixture which comprises diesel oil or the like and a quantity of an insecticide, such as "DDT" or "Lindane" therein; the mixture vaporizing in the form of smoke which delivers or billows from the device, and thence drifts about a relatively wide area to effectively exterminate the undesirable insects in such area.

An additional object of the instant invention is to provide an insecticide distributor, as above, which comprises—on a supporting frame—an electrically heated plate, and an electrically actuated sprayer positioned to discharge the liquid insecticide mixture as a mist or spray against such hot plate whereby the liquid is vaporized and creates the smoke which carries the insecticide about the surrounding area; the hot plate being disposed to cause the vapor or smoke to initially discharge upwardly, as is desirable for best results.

Another object of the invention is to provide an insecticide distributor of the type described which is compact and readily portable from place to place.

It is also an object of the invention to provide an insecticide distributor of the type described which is designed for ease and economy of manufacture, and convenience of use.

Still another object of the invention is to provide a practical, reliable, and durable insecticide distributor, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the device as in use.

Fig. 2 is a top plan of the same; the hot plate being partially broken away to illustrate an adjacent portion of the electric heating element.

Fig. 3 is an enlarged fragmentary section on line 3—3 of Fig. 2.

Referring now more particularly to the drawings, and to the characters of reference marked thereon, the device comprises a relatively small rectangular frame 1 of open construction, which frame includes side bars 2 and 3, and end bars 4 and 5. The frame 1 is disposed horizontally and is supported at the end which corresponds to the bar 4 by relatively short corner posts 6.

At the opposite end the frame 1 is supported, centrally of the sides 2 and 3, by a center post 7 which is fixed to and depends from the bar 5; such post including, at its lower end, a longitudinal, outwardly projecting foot 8.

An electrically actuated portable sprayer, indicated generally at 9, and which may be of conventional type, may be disposed directly above the foot 8; such sprayer including a cylindrical container 10 which rests on said foot 8.

An outwardly opening cradle 11 on the end bar 5 engages the container 10, and such container is normally maintained against escape from said cradle by a retention strap 12. The retention strap 12 encircles the outer portion of the container 10, and at its inner ends said strap includes tension bolts 13 which project through the end bar 5, being fitted inwardly of the latter with wing nuts 14.

At the top the container 11 includes a neck 15 on which is secured a head 16; the latter enclosing the electrically actuated power mechanism (not shown) which pumps liquid from the container 10 and discharges it through a nozzle 17 in a direction over the frame 1.

The head 16 includes a rearward or outward projection 18 from which a handle 19 depends. The electric cord which supplies the energizing current for the mechanism in the head 16 is indicated at 20; such cord extending upwardly into the head 16 through the handle 19 and projection 18. A switch (not shown) is interposed in the cord within the handle 19, and such switch is adapted to be worked by a trigger 21.

A circular hot plate 22 is disposed above the end of the frame 1 opposite the sprayer 9; such hot plate being inclined upwardly and outwardly for the purpose which will hereinafter appear; such plate being located so that one face A thereof is directly in the line of the spray from the nozzle 17.

The hot plate 22 rests on its under face B (opposite face A) against a similarly inclined electric heating element, indicated generally at 23.

The heating element 23 is of spirally wound metallic sheathed resistance type whose convolutions 24 are secured in connection with and supported by a spider 25. The arms of the spider 25 are formed at the end with outwardly projecting tongues 26, and said tongues project through corresponding, slotted spring fingers 27 on and depending from the periphery of the circular hot plate 22. In this manner the hot plate 22 is effectively but removably supported on the electric heating element 23.

The electric heating element 23 includes a pair of rigid depending legs 28 which are downward extensions of the ends of the inner and outer convolutions 24; such legs being clamped, as at 29, to the end bar 4, and said legs providing the supporting medium between the frame 1 and the heating element 23.

The lead wires for the heating element 23 are indicated at 30; such wires extending out of the legs 28 and thence entering a combination outlet and switch box 31 suspended in the frame 1 from a cross bar 32.

A lead-in or electric supply cord 33 extends into the switch box 31 and supplies the electric current both to the lead wires 30 and to the cord 20; the latter including a plug 34 which engages in a suitable outlet in the switch box 31. A switch 35 on the box 31 is connected into the circuit in a manner to turn the electric heating element 23 on or off. Turning of the sprayer 9 on or off is of course controlled by the switch actuating trigger 21.

The lead-in cord 33 is fitted, at the end opposite the switch box 31, with a conventional plug (not shown) which is adapted to engage in a standard electric outlet; the cord 33 preferably being of a substantial length.

The frame 1 is fitted, on top and directly below the lower portion of the hot plate 22, with a drip catch plate 36 which spans between the end bar 4 and cross bar 32, being full width of said frame 1.

In operation of the above described device a liquid insecticide mixture, such as diesel oil, with a quantity of an insecticide therein, is placed in the container 10.

Thereafter, with the hot plate 22 raised to a high heat by energization of the electric heating element 23, the sprayer 9 is placed in operation by manipulation of the trigger 21. This causes the liquid insecticide mixture to be sprayed from the nozzle 17, as at 37, directly onto the hot plate 22. As such liquid insecticide mixture impinges against such hot plate, the spray is immediately vaporized or turns to smoke; the latter blowing away from the hot plate, as at 38.

As the hot plate 22 is disposed at a forward and upward incline, the insecticide carrying smoke 38 is initially delivered upwardly, as is desirable to the most effective dissemination of the smoke into the surrounding area. As the smoke disseminates or floats into the surrounding area, insecticide carried in such smoke effectively kills the undesirable insects in such area, such as mosquitoes, flies, gnats, and other insects.

The device, being readily portable, can be moved from place to place as required; the only condition being that the cord 33 be of a length to reach the nearest electric outlet.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An insecticide distributor comprising a support, a plate mounted in connection with the support, the plate having one face exposed to the outside of the distributor, means to heat the plate from the face thereof opposite said exposed face, a sprayer for a liquid insecticide mixture, said sprayer including a nozzle, and means mounting the sprayer in connection with the support in position for spray discharge from said nozzle directly onto the exposed face of said heated plate.

2. A portable insecticide distributor comprising a substantially horizontal frame adapted to rest on a support, an electric heating element disposed above one end of the frame, said heating element including legs secured to the frame at said end, the legs supporting the heating element from the frame at a longitudinally upward and outward incline, a hot plate secured flush on the heating element whereby the upper face of said plate is exposed in the direction of the end of the frame opposite said plate, a sprayer for a liquid insecticide mixture, the sprayer including a nozzle, and means mounting the sprayer on the frame at the end opposite the plate with the nozzle positioned to discharge spray onto said plate.

3. A portable insecticide distributor comprising a relatively small rectangular frame disposed substantially horizontally, said frame including side bars and end bars, relatively short posts extending downwardly from the frame adapted to rest on a support, an electric heating element disposed above one end bar, said electric heating element including depending legs secured to said one end bar, a hot plate secured on the electric heating element, the electric heating element and hot plate assembly being disposed with said hot plate disposed so that it has its upper face exposed in the direction of the end of the frame opposite said plate, a sprayer for a liquid insecticide mixture, said sprayer including a nozzle, and means mounting the sprayer in connection with the other end bar in position for spray discharge from said nozzle onto said exposed face of the plate.

4. An insecticide distributor comprising a support, a sprayer for a liquid insecticide mixture including a spray nozzle, means mounting the sprayer in fixed connection with the support, and a heated member exposed to the outside of the distributor mounted on the support in spaced opposed relation to the nozzle in position and of a size to intersect the spray emanating from the nozzle whereby to heat and vaporize such spray for dissemination thereof into the air about said member.

5. An insecticide distributor comprising a sprayer for a liquid insecticide mixture, said sprayer including a spray nozzle from which the mixture is discharged in spray form and an element back of the nozzle and attached thereto providing a handle for the support and manipulation of the sprayer by hand, a frame on which the sprayer is mounted, said frame projecting from the sprayer beyond the nozzle in the direction of the axis thereof, and a heated plate mounted on said projecting portion of the frame with one face of the plate facing the nozzle in the path of the spray issuing from the nozzle for impingement thereby and disposed at an upward angle to the axis of the nozzle.

6. In a portable insecticide distributor which comprises a support for a heated plate having an exposed face, and an insecticide sprayer including a nozzle and a container; means to releasably mount the sprayer in fixed connection with the support and including a retention strap mounted on the support for releasable clamping engagement about the container and adapted to locate the sprayer so that the nozzle faces said exposed face of the plate.

References Cited in the file of this patent

UNITED STATES PATENTS

| | | |
|---|---|---|
| 918,747 | Hertzbert et al. | Apr. 20, 1909 |
| 1,142,861 | Van Wie et al. | June 15, 1915 |
| 1,175,603 | Clausen | Mar. 14, 1916 |
| 1,566,185 | Elmgren | Dec. 15, 1925 |
| 1,677,553 | Dissett | July 17, 1928 |
| 1,719,343 | Strayer | July 2, 1929 |
| 1,930,869 | Baden | Oct. 17, 1933 |
| 2,313,976 | Sullivan et al. | Mar. 16, 1943 |
| 2,662,332 | McIntire | Dec. 15, 1953 |
| 2,685,146 | Stevens | Aug. 3, 1954 |

FOREIGN PATENTS

| | | |
|---|---|---|
| 262,716 | Switzerland | Oct. 17, 1949 |